US011614006B1

(12) United States Patent
Perkins et al.

(10) Patent No.: US 11,614,006 B1
(45) Date of Patent: Mar. 28, 2023

(54) INTAKE VALVE SYSTEMS (71) Applicant: Southwest Research Institute, San Antonio, TX (US)

(72) Inventors: Anthony Perkins, Shoreham-by-Sea (GB); Riccardo Meldolesi, Hove (GB); Clive Lacy, Goring-by-Sea (GB); Dustin Kramer, Helotes, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 0 days.

(21) Appl. No.: 17/452,136

(22) Filed: Dec. 10, 2021

(51) Int. Cl.
*F01L 3/20* (2006.01)
*F02B 31/04* (2006.01)
*F01L 1/30* (2006.01)

(52) U.S. Cl.
CPC ........ *F01L 3/20* (2013.01); *F01L 1/30* (2013.01); *F02B 31/04* (2013.01); *F01L 2820/02* (2013.01)

(58) Field of Classification Search
CPC .......... F01L 2820/02; F01L 1/30; F02B 31/04
See application file for complete search history.

(56) References Cited

U.S. PATENT DOCUMENTS

| 2,028,387 A * | 1/1936 | Forman | F02M 35/10321 |
| | | | 123/188.2 |
| 2003/0019482 A1 * | 1/2003 | Kawano | F02M 25/0809 |
| | | | 123/519 |
| 2008/0236517 A1 * | 10/2008 | Togawa | F04D 15/0027 |
| | | | 123/41.05 |

FOREIGN PATENT DOCUMENTS

| EP | 0013180 A1 * | 7/1980 | |
| EP | 0690214 A2 * | 1/1996 | |
| JP | 2004197614 A * | 7/2004 | F02D 41/0072 |

* cited by examiner

*Primary Examiner* — Kevin A Lathers
(74) *Attorney, Agent, or Firm* — Grossman, Tucker, Perreault & Pfleger, PLLC (57) ABSTRACT

A valve system that includes a housing defining an intake port, a cylinder port and a valve bore; wherein the intake port defining a valve seat portion at an interface between the intake port and the cylinder port. The valve system also includes a valve to control fluid communication between the intake port and the cylinder port. The valve includes a valve stem disposed within the valve bore and extending into the cylinder port and extending out of the housing, the valve stem having an open face exposed to atmospheric pressure and a valve head coupled to the valve stem comprising a first face and an opposing second face. A diameter of the valve stem is selected to control a closing force on the first face of the valve head.

22 Claims, 12 Drawing Sheets

INTAKE VALVE SYSTEMS

FIELD

The present disclosure relates to intake valve systems, and more particularly, to springless intake valve systems.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

Figure 1:
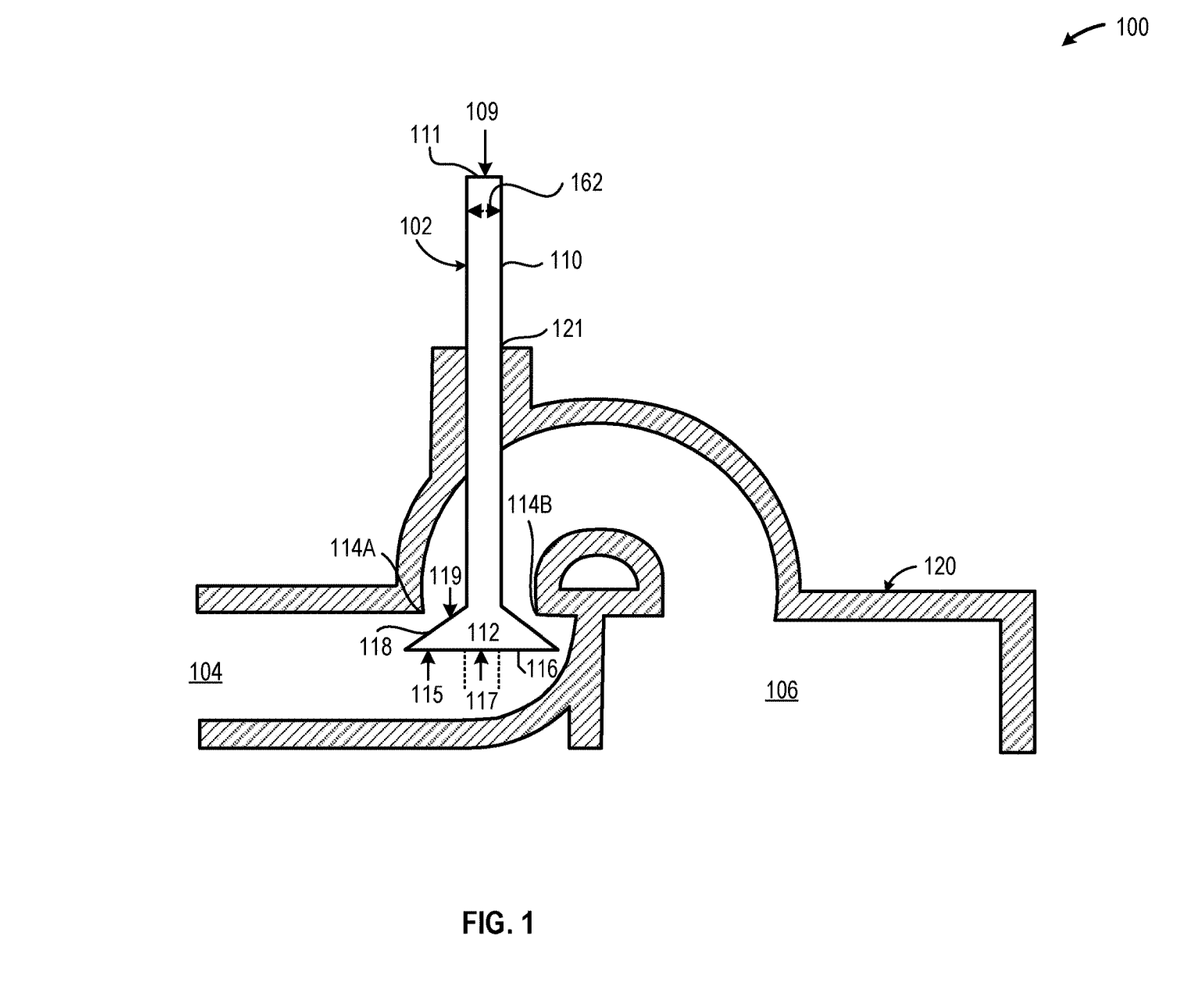
FIG. 1 illustrates a cross-sectional view of an intake valve system according to one embodiment of the present disclosure.

FIG. 1 illustrates a cross-sectional view of an intake valve system 100 according to one embodiment of the present disclosure. The intake valve system 100 may be used, for example, in a waste heat recovery system, for example, using supercritical CO2 (sCO2). The intake valve system 100 includes a housing 120 defining an intake port 104, a cylinder port 106. The housing is 120 is illustrated in cross hatching in the drawings, and should be understood to represent a cross section of the valve system 100. The housing 120 also defines a valve bore 121. An intake valve 102 is positioned between the intake port 104 and the cylinder port 106 to provide controllable fluid communication between the intake port 104 and the cylinder port 106. In other words, the valve 102 is positioned between the intake port 104 and the cylinder port 106 to control flow of fluids from the intake port 104 to the cylinder port 106. The valve 102 includes a valve stem 110 and a valve head 112. The valve stem 110 is positioned in the valve bore 121 so that a portion of the valve stem 110 extends into the cylinder port 106 and a portion of the valve stem 110 remains outside of the housing 120, as generally illustrated in FIG. 1. The top 111 of the valve stem 110 may be coupled to a cam mechanism (for example, a cam lobe, cam follower, etc., not shown) to force the valve 102 to open, as described below.

In operation, the valve stem 110 is forced downward (via cam mechanisms coupled to a top portion 111 of the valve stem 110), not shown) such the head portion 112 is forced into the intake port 104 ("open cycle"). Just before the open cycle, pressure in the intake port 104 is much greater than pressure in the cylinder port 106. As the valve 102 is forced downward, thus starting an open cycle, pressure between the intake port 104 and the cylinder port 106 begins to equalize. At the end of the open cycle (as may be controlled by physical dimensions and/or rotational speed of a cam mechanism, not shown), forces on the valve 102 (described below) move the valve 102 upward until pressure at the bottom surface 116 of the valve head 112 cause the valve head 112 to seal against valve seat portion 114 (illustrated as 114A, 114B in cross section) defined in the intake port 104 ("closed cycle"). As illustrated, the valve seat portion 114 is defined in the intake port 104, at an interface between the intake port 104 and the cylinder port 106.

As a general matter, the pressure in the intake port 104 (Pport) is much greater than atmospheric pressure (Patm), i.e., Pport>>Patm. When the valve 102 is closed, the pressure in the cylinder port 106 (Pcyl) is less than Pport (Pport>Pcyl), and Pcyl is much greater than Patm (Pcyl>>Patm). Thus, in the closed cycle, Pport>>Pcyl, and Pport>>Patm. When the valve 102 is open, Pport and Pcyl equalize, and thus in the open cycle Pport=Pcyl, and Pport>>Patm. In both open and closed cycles, an upward force acting on the bottom surface 116 of the valve head 112 is generally defined as Pport×the surface area of the bottom surface 116 (A116). This upward force is illustrated by arrow 115. When the valve is closed, a downward force acting on the top surface 118 of the valve head 112 is generally defined as Pcyl×the surface area of the top surface 118 (A118). When the valve is open, a downward force acting on the top surface 118 of the valve head 112 is generally defined as Pport×the surface area of the top surface 118 (A118). This downward force is illustrated by arrow 119. In both open and closed cycles, a downward force acting on the top surface 111 of the valve stem 102 is generally defined as Patm×the surface area of the top surface 111 (A111). Of note, since Patm is much less than both Pcyl and Pport, a net upward force (closing force) is present on the valve head 112 in both the open and closed positions. Thus, the closing force when the valve is closed may be represented as:

$$F\text{closed}=(P\text{port}\times A116)-(P\text{cyl}\times A118)-(P\text{atm}\times A111);$$
$$\text{where } (P\text{port}\times A116)>((P\text{cyl}\times A118)+(P\text{atm}\times A111))$$

The closing force when the valve is open may be represented as:

$$F\text{open}=(P\text{port}\times A116)-(P\text{port}\times A118)-(P\text{atm}\times A111);$$
$$\text{where } (P\text{port}\times A116)>((P\text{port}\times A118)+(P\text{atm}\times A111))$$

Accordingly, in this embodiment, the diameter (width) 162 of the valve stem 102 is selected to control the net upward force (closing force) acting on the valve. The closing force is illustrated as arrow 117. The larger the diameter 162 of the valve stem 110 (and thus, the larger the surface area of the top surface 111) increases the closing force 117, and decreasing the diameter 160 of the valve stem 110 decreases the closing force 117. In operation, as the valve opens and closes, the inertial forces of the valve is generally a function of the momentum (mass velocity), resting mass and friction of the valve 102 and valve train components. According to the teachings herein, the diameter 162 of the valve stem 110 is selected to be larger than the inertial forces of the valve 102 and valve train components so that, in the open position, the closing force 117 is sufficient to force the valve 102 upward, and in the closed position, the closing force 117 is sufficient to ensure that the valve 102 remains seated on the valve seats 114A/114B and that the valve 102 does not decouple from the valve train components. Selecting a diameter 162 of the valve stem 110 according to the teachings herein may reduce or eliminate the need for valve springs, gas springs, etc. which may increase overall speed and efficiency of valve operation allowing shorter opening periods.

As described above, FIG. 1 illustrates eliminating valve springs by providing the valve opening into the intake port 104 and adjusting the diameter 160 valve stem diameter 110 to account for sufficient closing force to maintain coupling of the valve and valve train components. It will be appreciated that, when the valve 102 is closed, large pressure loads remain, since Pport>>Pcyl>>Patm. Thus, in order to open the valve 102, this large force needs to be overcome by the valve train components, which may cause significant stress and/or deformation of the valve/valve train components. In addition, as the valve opens and Pcyl equalizes to Pport, this large force quickly dissipates, which may cause relaxation of the valve/valve train components which may trigger vibrations.

Figure 2:
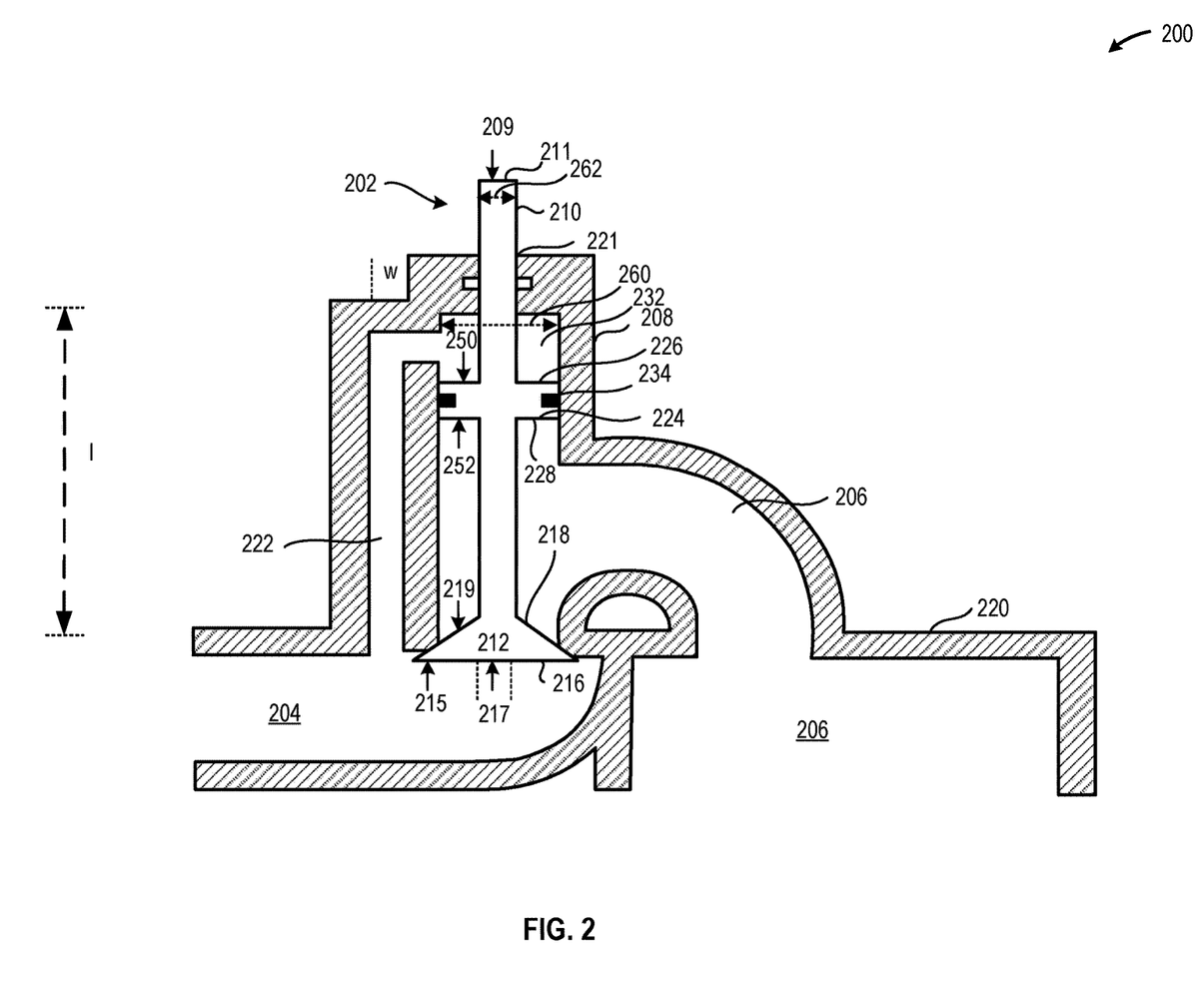
FIG. 2 illustrates a cross-sectional view of an intake valve system according to another embodiment of the present disclosure.

FIG. 2 illustrates a cross-sectional view of an intake valve system 200 according to another embodiment of the present disclosure. Similar to the valve system 100 of FIG. 1, the intake valve system 200 includes an intake valve 102 positioned between an intake port 204 and a cylinder port 206 to control flow of combustion fluids and/or combustion products from the intake port 204 to the cylinder port 206, as described above.

In this embodiment, the housing 220 defines an extension portion 208 of the cylinder port 206. Also in this embodiment, the valve stem 210 includes a plate member 224 rigidly affixed to the valve stem 210. The plate member 224 is positioned along the length of the valve stem 210 within the extension portion 208, as generally depicted in FIG. 2. The plate member 224 includes a first face 226 and a second face 228, and is dimensioned to fit within the extension portion 208. The plate member 224 may also include a seal 234 so that no fluid communication occurs across the plate member 224 (i.e., the plate member 224 is sealed within the extension portion 208). The plate member 224 is positioned within the extension portion 208 so that an open volume 232 is defined between the first face 226 of the plate member 224 and the housing that defines the extension portion 208. The open volume 232 increases and decreases in volume as the valve 202 moves up and down during cycling.

In this embodiment, the housing 220 defines a pipe 222 to provide fluid communication between the intake chamber 204 and the open volume 232 (and thus, the first (top) face 226 of the plate member 224). The pipe 222, in this embodiment, has a width (w) approximately equal to a cross sectional width of the valve stem 210, and a length (l) to extend from the intake port 204 to the open volume 232. Thus, and considering first a closed cycle as illustrated in FIG. 2, the first (top) face 226 of the plate member 224 is exposed to the pressure within the intake port 204 (Pport), thus causing a downward force 250 on the valve 202. The bottom face 216 of the valve head 212 is also exposed to Pport, thus causing an upward force 215 on the valve 202. Also, in the closed position, the bottom face 228 of the plate member 224 is exposed to the pressure in the cylinder port 206 (Pcyl), thus causing an upward force 252 on the valve 202. Building on the equations from the embodiment of FIG. 1, in the closed position, the closing force may be represented as:

$$F\text{closed}=(P\text{port}\times A216)-(P\text{cyl}\times A218)+(P\text{cyl}\times A228)-(P\text{port}\times A226)-(P\text{atm}\times A211).$$

As can be appreciated, if area 218 is the same as 228, forces 219 and 252 cancel, resulting in:

$$F\text{closed}=(P\text{port}\times A216)-(P\text{port}\times A226)-(P\text{atm}\times A211);$$
$$\text{where }(P\text{port}\times A216)>((P\text{port}\times A226)+(P\text{atm}\times A211))$$

The closing force when the valve 202 is open may be represented as:

$$F\text{open}=(P\text{port}\times A216)-(P\text{port}\times A218)+(P\text{port}\times A228)-(P\text{port}\times A226)-(P\text{atm}\times A211).$$

As can be appreciated, when the valve is open and A228 is equal to A226, forces 252 and 250 cancel resulting in:

$$F\text{open}=(P\text{port}\times A216)-(P\text{port}\times A218)-(P\text{atm}\times A211)$$

In addition, when the valve is open the difference in area on which the pressure acts either side of valve head 212 is equal to the valve stem area A211. Therefore Fopen can be further simplified to:

$$F\text{open}=(P\text{ort}-P\text{atm})\times A211$$

Accordingly, and compared to the embodiment of FIG. 1, by providing the open volume 232 and the pipe 222 as described above to generate the downward force 250 on the valve 202, less force is needed to open the valve 202 (i.e., net force on the valve 202 is reduced), and less force is exerted on the valve 202 when the valve 202 is closed. In an open cycle, when the valve 202 is open, both faces of the plate member 224 are exposed to the intake pressure so that the plate member 224 does not impede movement of the valve 202.

A diameter 260 of the plate member 224 may be selected to increase or decrease the closing force acting on the valve 210. The larger the diameter 260 of the plate member 224 (and thus, the larger the surface area of the top surface 226 and bottom surface 228) decreases the closing force 217, and decreasing the diameter 260 of the plate member 224 increases the closing force 217. In operation, as the valve opens and closes, the inertial forces of the valve is generally of function of the momentum (mass velocity), resting mass and friction of the valve 202 and valve train components. According to the teachings herein, the diameter 260 of the plate member 224 is selected to be larger than the inertial forces of the valve 202 and valve train components so that, in the open position, the closing force 217 is sufficient to move the valve 202 upward, and in the closed position, the closing force 217 is sufficient to ensure that the valve 202 remains seated on the valve seats and that the valve 202 does not decouple from the valve train components. Selecting the diameter 260 of the plate member 224 according to the teachings herein may reduce or eliminate the need for valve springs, gas springs, etc. which may increase overall speed and efficiency of valve operation allowing shorter opening periods.

In some embodiments, in addition to selecting the diameter 260 of the plate member 224, selection of the diameter 262 of the valve stem 210, as described above with reference to FIG. 1, may also be incorporated to provide greater control over the closing force acting on the valve 210.

Figure 3:
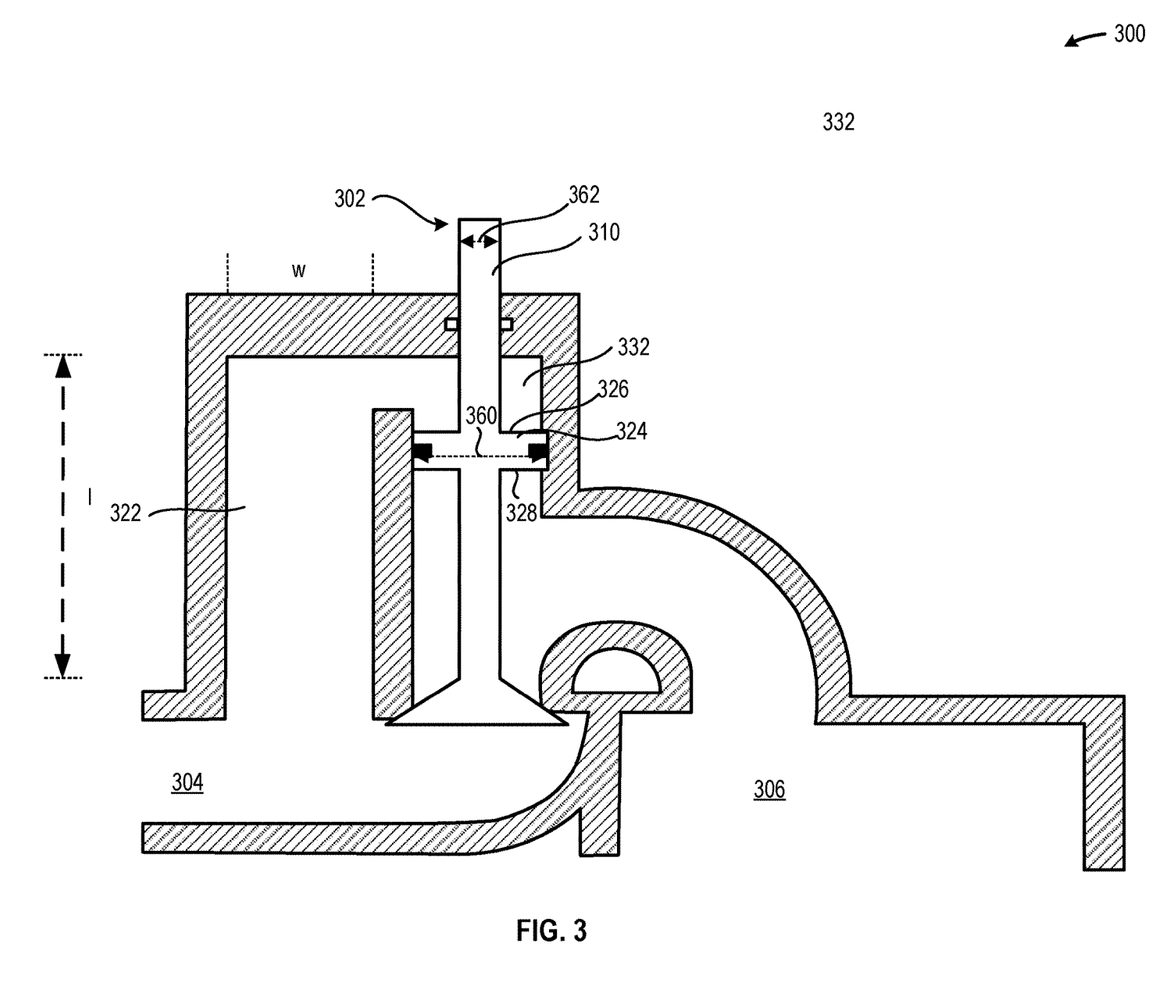
FIG. 3 illustrates a cross-sectional view of an intake valve system according to another embodiment of the present disclosure.

FIG. 3 illustrates a cross-sectional view of an intake valve system 300 according to another embodiment of the present disclosure. This embodiment is similar to the valve system 200 of FIG. 2, except the width of the pipe 322 is selected to provide greater control over pressure fluctuations acting on the top face 326 of the plate member 324, than in the embodiment of FIG. 2. As may be appreciated, the pressure in the intake port 304 is not constant under most operating conditions. For example, during cyclic operation (closed cycle-open cycle), opening of the valve 302 may result in unsteady flow rates in the intake port 304, and thus cause fluctuations in pressure in the intake port 304. Accordingly, in the embodiment of FIG. 3, the pipe 322 is selected to have a length, width, and/or volume that reduces or eliminates pressure fluctuations in the open volume 332 above the top face 326 of the plate member 324. For example, the length, width and/or volume of the pipe 322 may be selected so that fluid in the open area 332 experiences substantially adiabatic expansion and compression transformation, thus reducing or eliminating pressure fluctuations present at the top face 326 of the plate member 324.

In addition to selecting a length, width and/or volume for the pipe 322, described above, the embodiment of FIG. 3 may also include other mechanisms to control pressure fluctuations on the valve 302. For example, the length and/or diameter of the intake port 304 may be selected to reduce or eliminate pressure fluctuations therein. As another example, to control pressure fluctuations, Helmoltz resonators or the like may be placed in the intake port 304 (and/or manifold upstream from the intake port 302). The forces on the valve 302 are similar to those described above with reference to FIG. 2. Selection of the cross-sectional width of the valve stem 310, as described above with reference to FIG. 1, may also be incorporated into the embodiment of FIG. 3 to provide greater control over the closing force acting on the valve 310.

As with the previous embodiments and described above, a diameter 360 of the plate member 324 may be selected to increase or decrease the closing force acting on the valve 302 and to provide greater control over the closing force acting on the valve 310. In addition, as with the previous embodiments and described above, the diameter 362 of the valve stem 310 may be selected to increase or decrease the closing force acting on the valve 302 and to provide greater control over the closing force acting on the valve 310.

Figure 4:
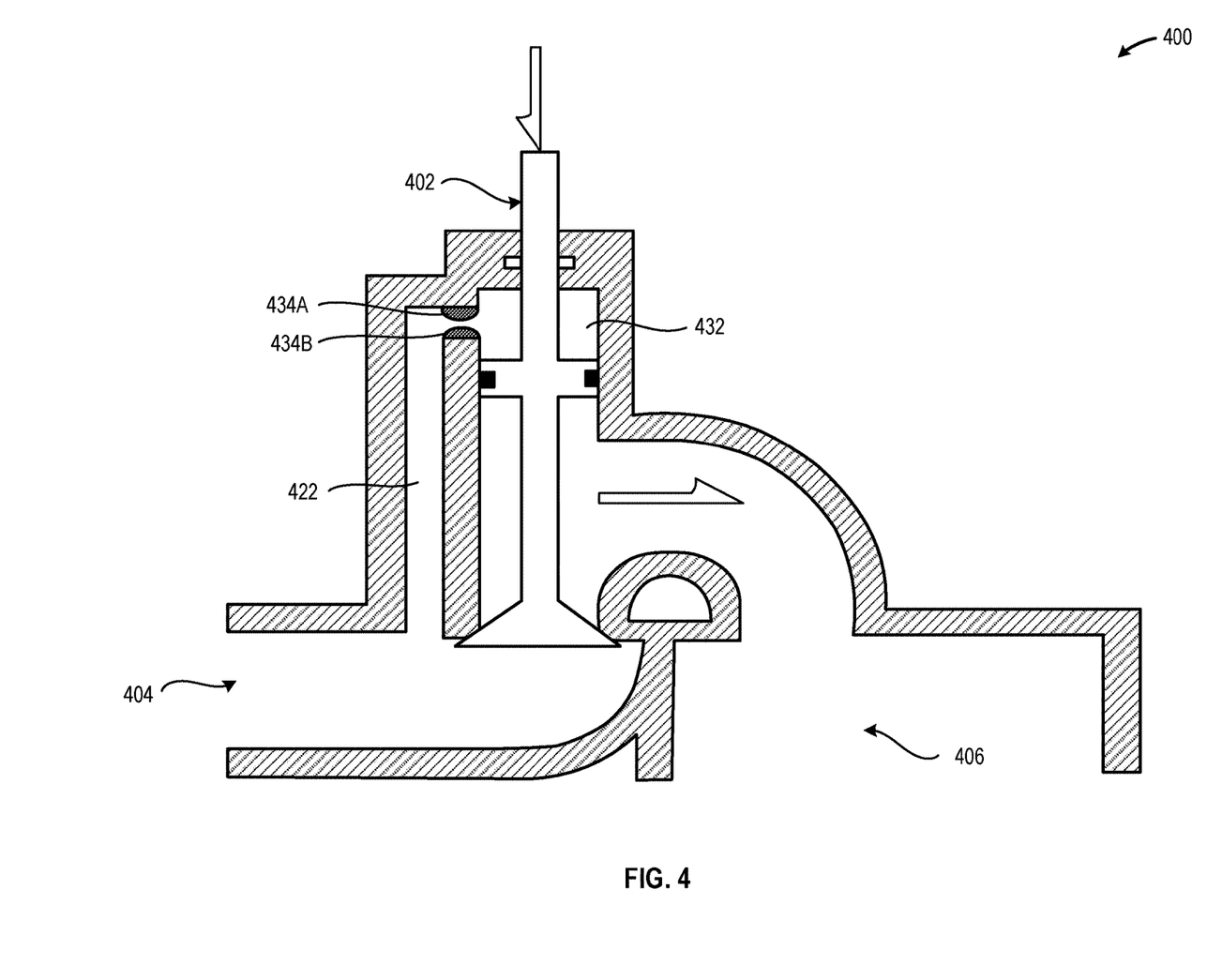
FIG. 4 illustrates a cross-sectional view of an intake valve system according to another embodiment of the present disclosure.

FIG. 4 illustrates a cross-sectional view of an intake valve system 400 according to another embodiment of the present disclosure. This embodiment is similar to the valve system 200 of FIG. 2, and further includes flow restrictors 434A and 434B positioned between the pipe 422 and the open volume 432. The flow restrictors 434A and 434B generally operate to isolate the open area 432 from the intake port 404 from large pressure variations, as may occur during opening/closing of the valve 402. The flow restrictors 434A and 434B may have a generally half-circular/ellipsoid cross section to reduce, for example, perturbations in fluid flow, as the open area 432 equalizes with the second fluid passageway 422.

As with the previous embodiments and described above, a diameter of the plate member may be selected to increase or decrease the closing force acting on the valve 402 and to provide greater control over the closing force acting on the valve 402. In addition, as with the previous embodiments and described above, the diameter of the valve stem may be selected to increase or decrease the closing force acting on the valve and to provide greater control over the closing force acting on the valve. In addition, as with the previous embodiments and described above, the length, width and/or volume of the pipe 422 may be selected to provide greater control over the closing force acting on the valve.

Figure 5:
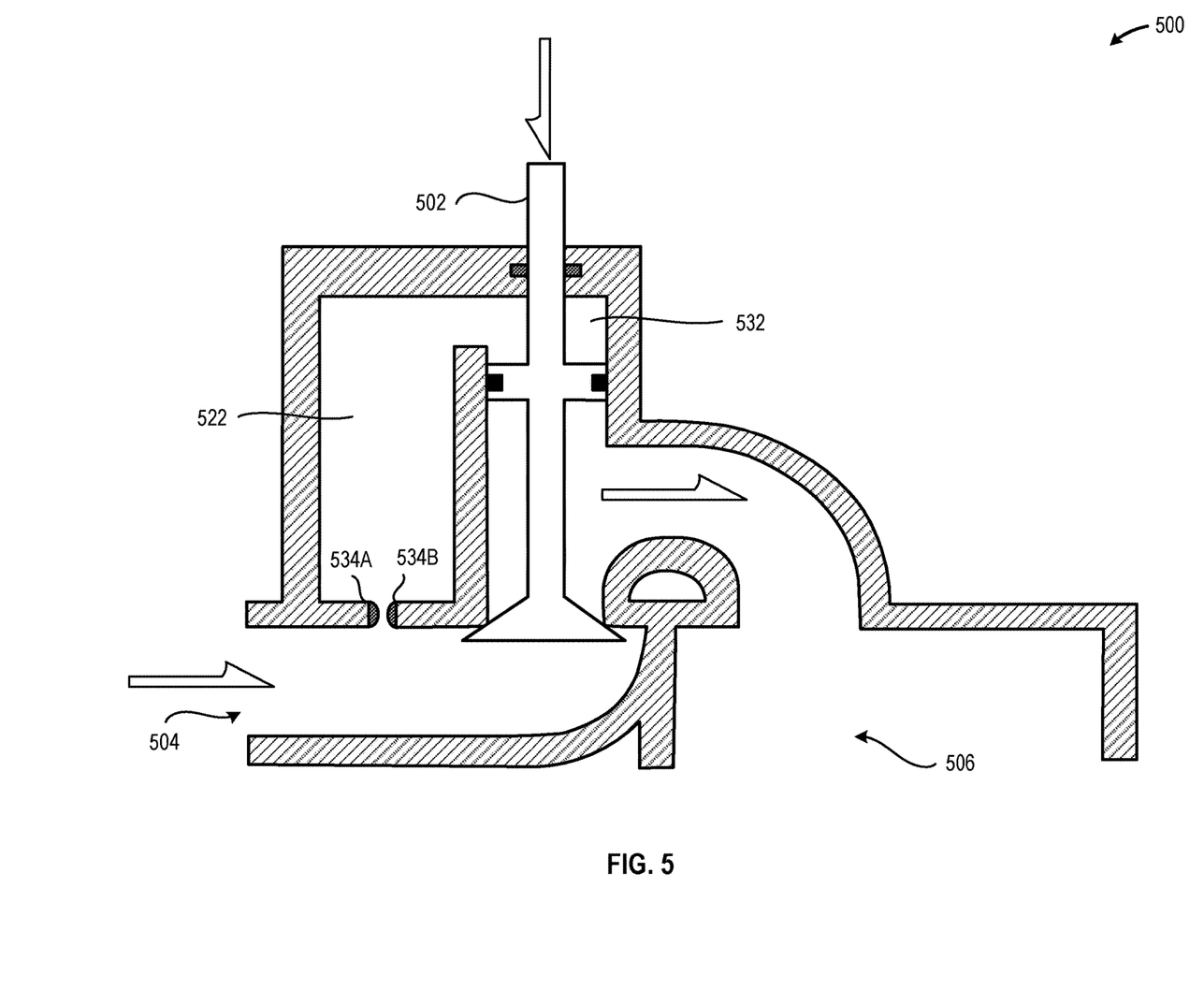
FIG. 5 illustrates a cross-sectional view of an intake valve system according to another embodiment of the present disclosure.

FIG. 5 illustrates a cross-sectional view of an intake valve system 500 according to another embodiment of the present disclosure. This embodiment is similar to the valve system 300 of FIG. 3, and further includes flow restrictors 534A and 534B positioned between the second fluid passageway 522 and the intake chamber 504. The flow restrictors 534A and 534B generally operate to isolate the fluid passageway 522 from the intake chamber 504 from large pressure variations, as may occur during opening/closing of the valve 502. The flow restrictors 534A and 534B may have a generally half-circular/ellipsoid cross section to reduce, for example, perturbations in fluid flow, as the open area 532 equalizes with the second fluid passageway 522. Of course, in the embodiments of FIGS. 4 and/or 5, the flow restrictors may be placed anywhere within the pipe 422/522, and may define a gap defined between the flow restrictors which may be based on particular operating environment conditions, e.g., pressure within the intake port, valve cycling speed, etc.

As with the previous embodiments and described above, a diameter of the plate member may be selected to increase or decrease the closing force acting on the valve 502 and to provide greater control over the closing force acting on the valve 502. In addition, as with the previous embodiments and described above, the diameter of the valve stem may be selected to increase or decrease the closing force acting on the valve and to provide greater control over the closing force acting on the valve. In addition, as with the previous embodiments and described above, the length, width and/or volume of the pipe 522 may be selected to provide greater control over the closing force acting on the valve.

Figure 6:
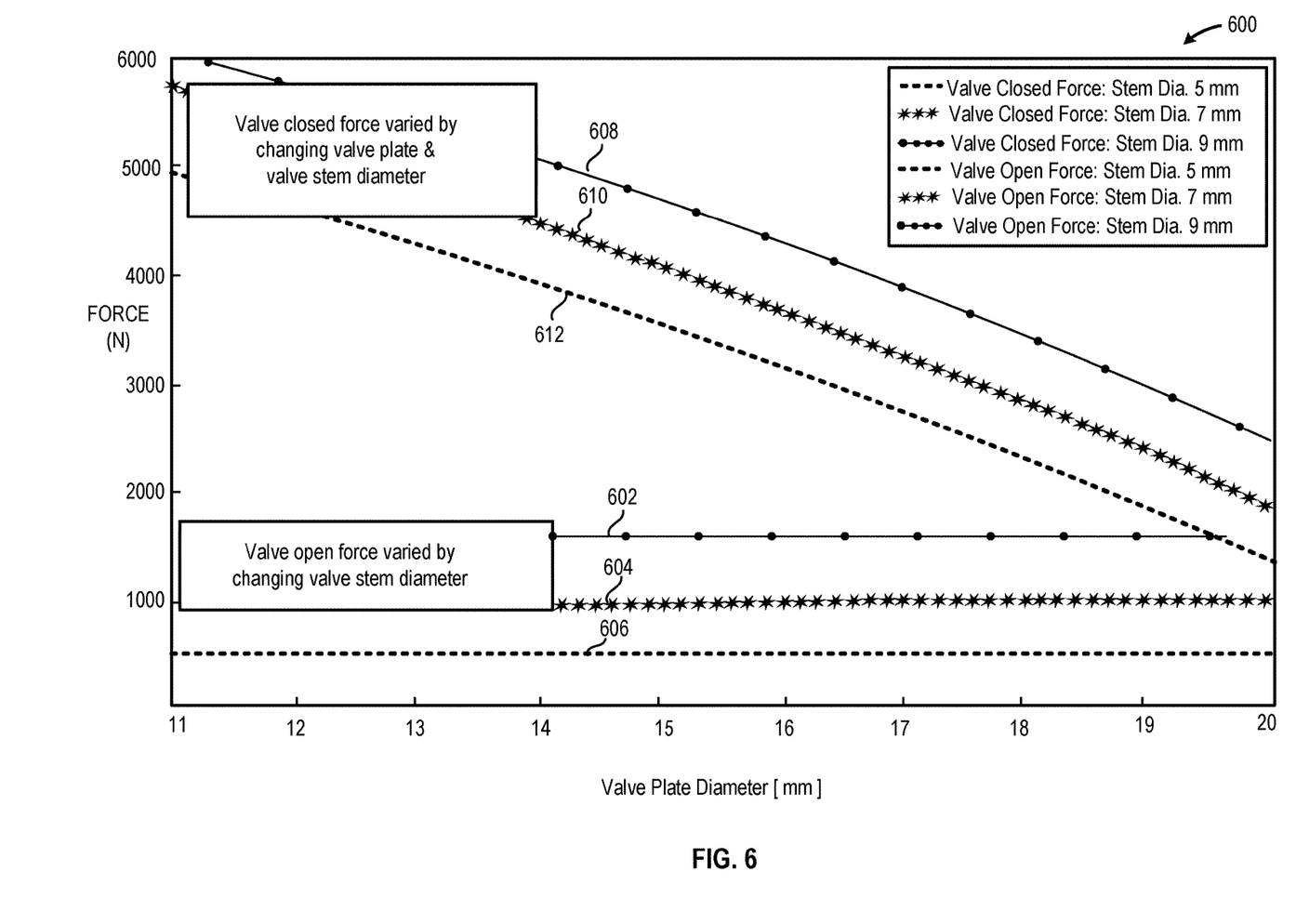
FIG. 6 illustrates a graph of example force curves for any one, or any combination, of the valve systems of FIGS. 1-5.
Figure 7:
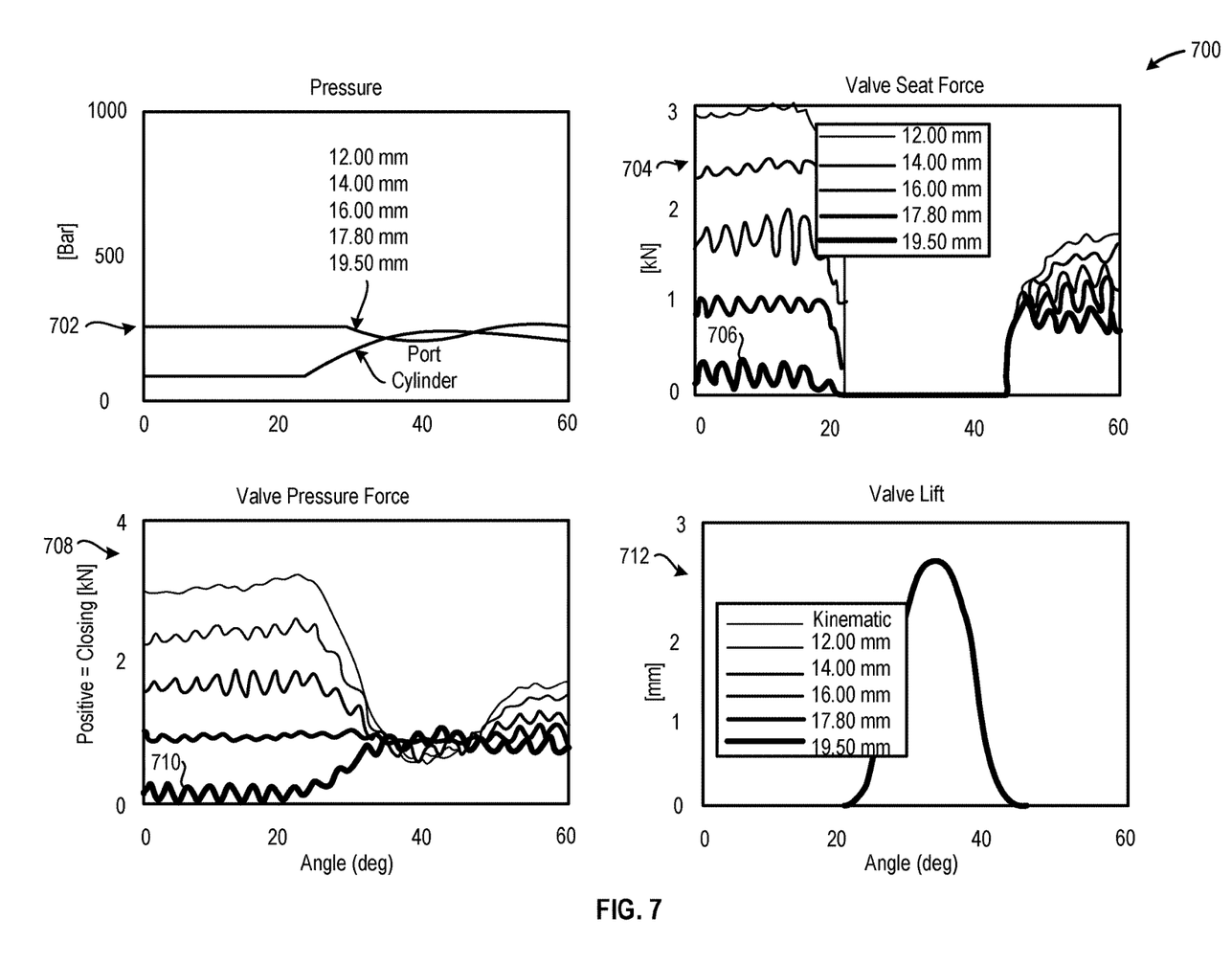
FIGS. 7A, 7B, 7C and 7D illustrate example dynamic effect graphs for selected plate member diameters for any one, or any combination, of the valve systems of FIGS. 2-5.
Figure 7A:
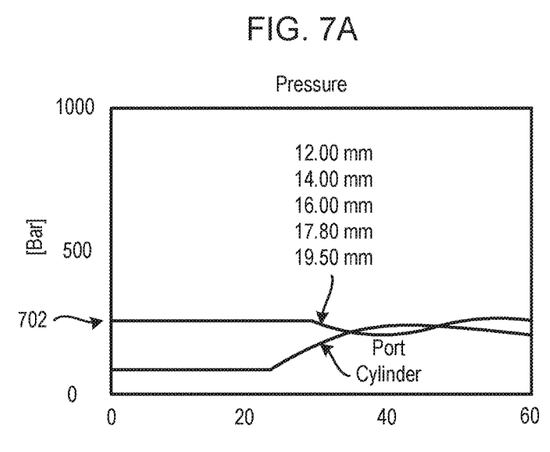
Figure 7B:
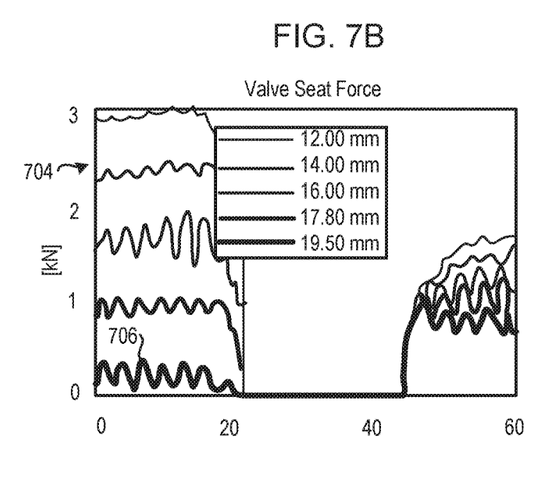
Figure 7C:
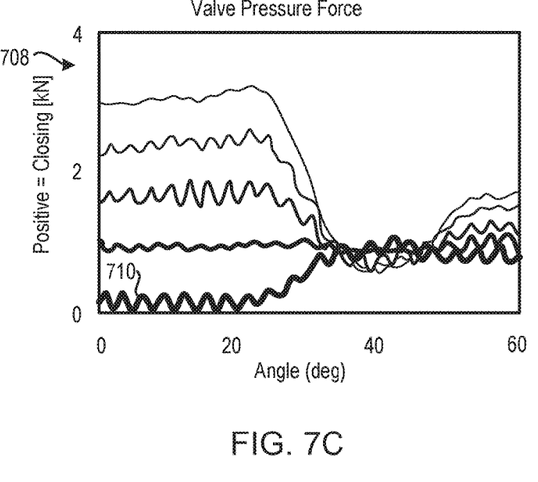
Figure 7D:
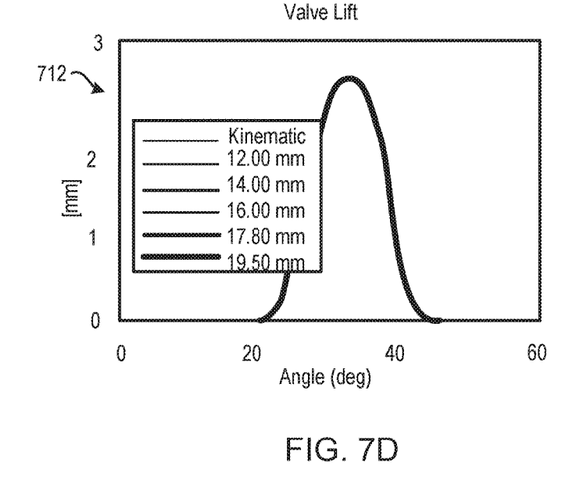
Figure 8:
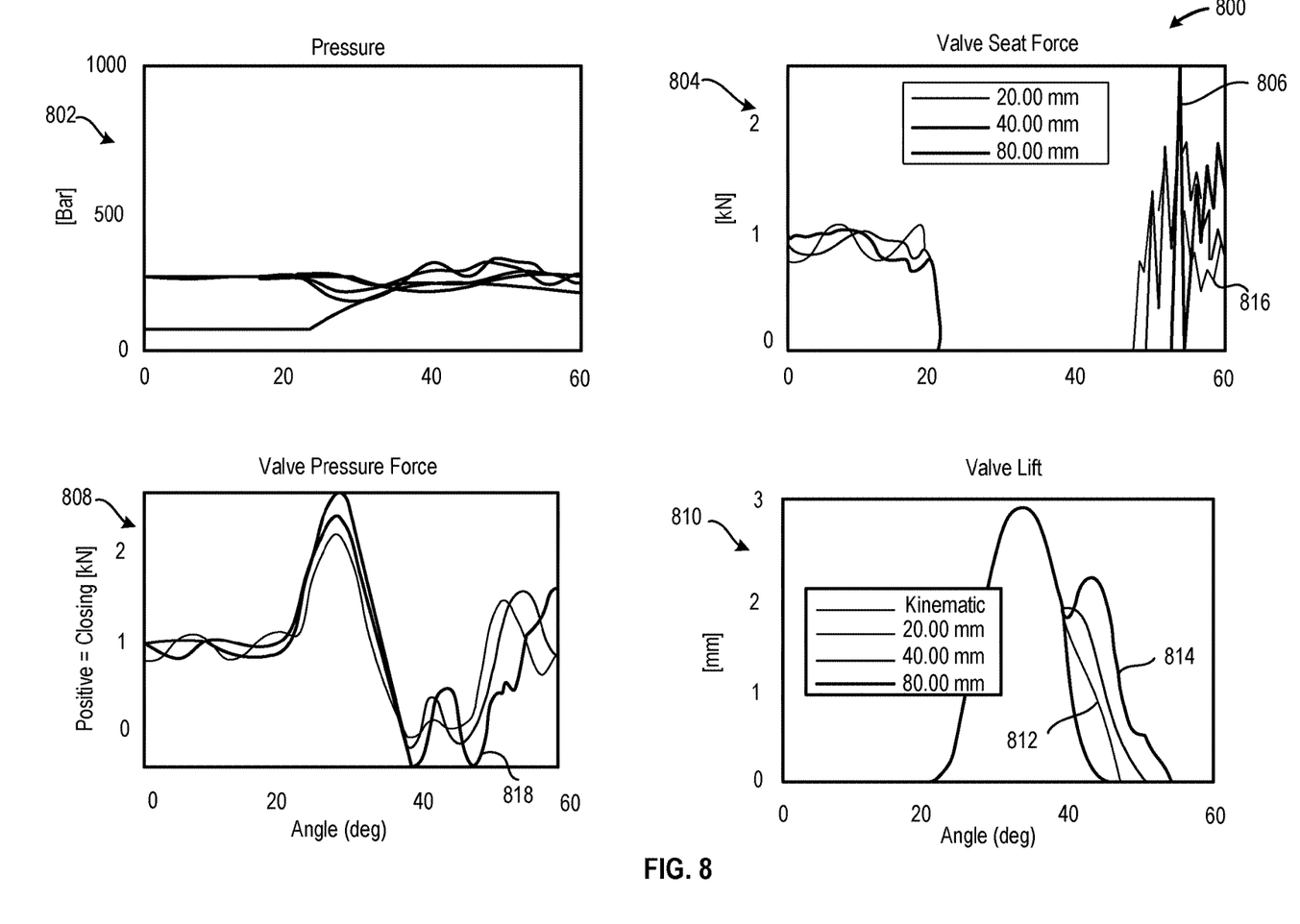
FIGS. 8A, 8B, 8C and 8D illustrate example dynamic effect graphs for selected pipe lengths for any one, or any combination, of the valve systems of FIGS. 2-5.
Figure 8A:
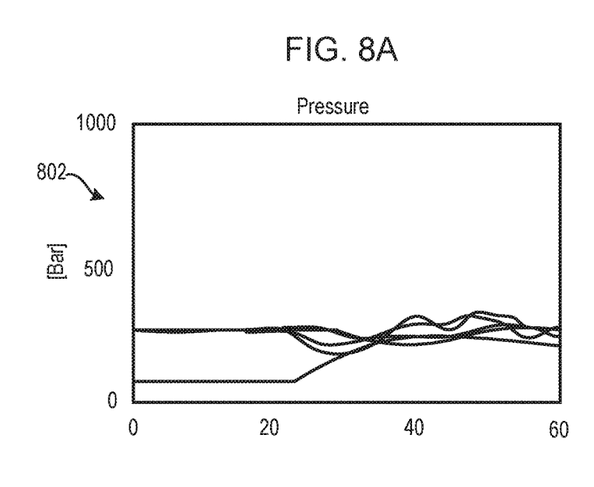
Figure 8B:
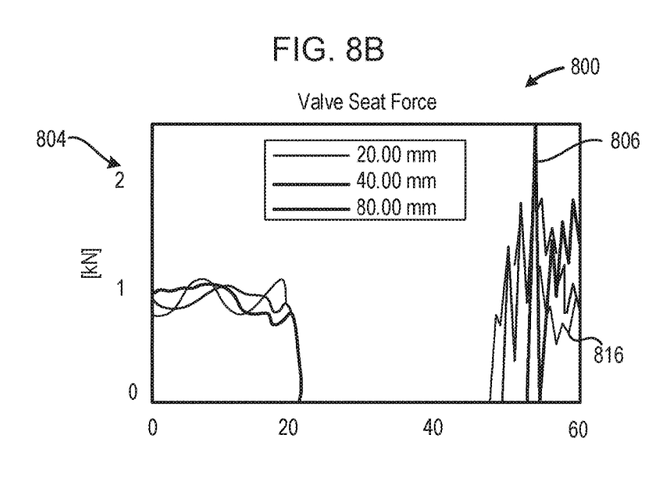
Figure 8C:
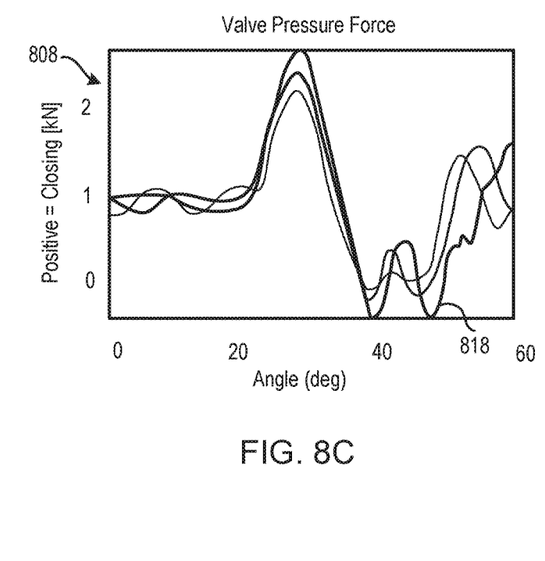
Figure 8D:
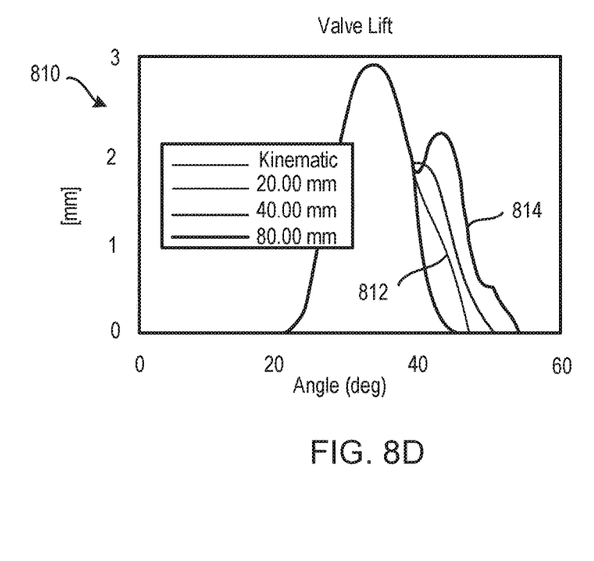
Figure 9:
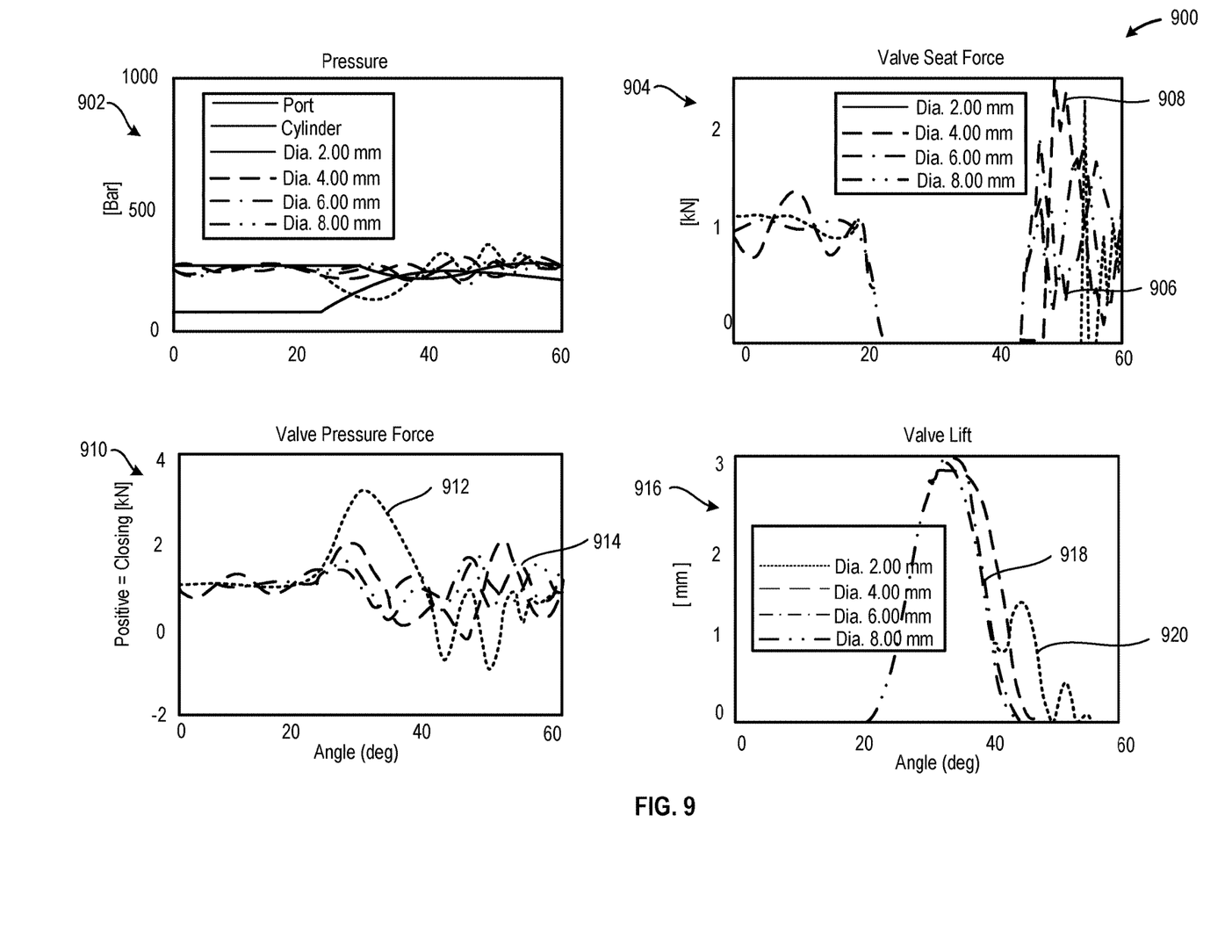
FIGS. 9A, 9B, 9C and 9D illustrate example dynamic effects graphs for selected pipe widths for any one, or any combination, of the valve systems of FIGS. 2-5.
Figure 9A:
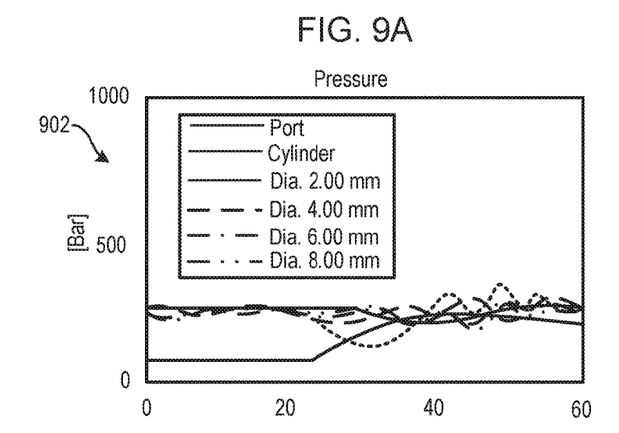
Figure 9B:
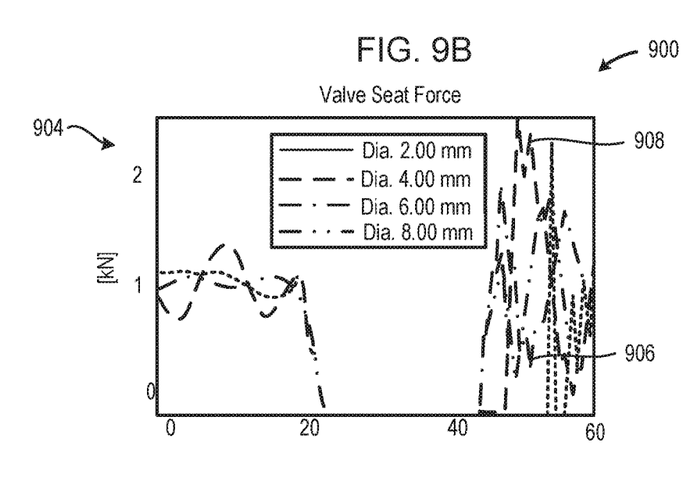
Figure 9C:
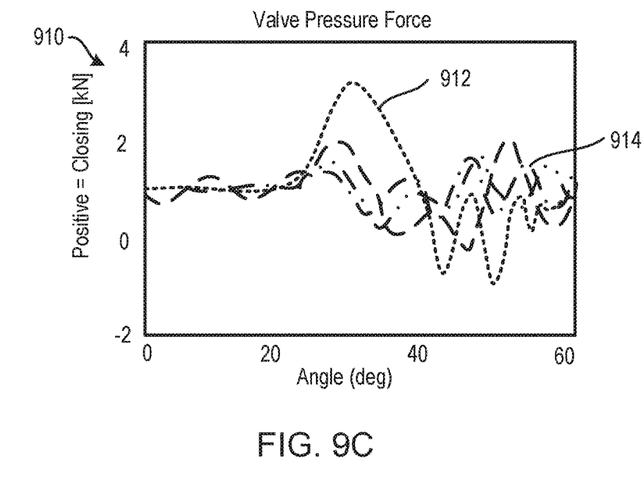
Figure 9D:
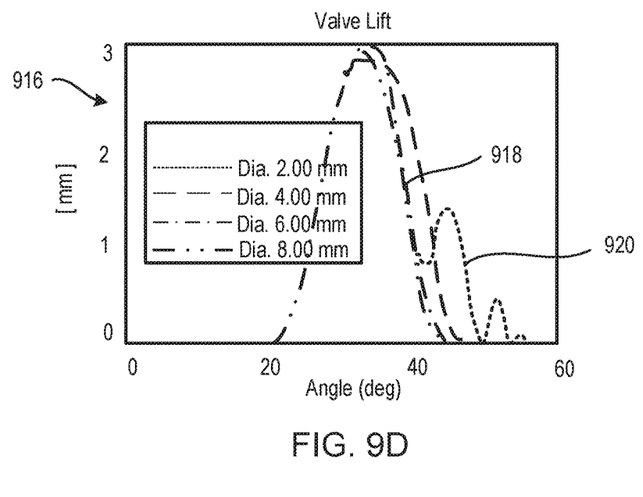

FIG. 6 illustrates a graph 600 of example force curves for any one, or any combination, of the valve systems of FIGS. 1-5. In particular, the graph 600 illustrates force curves for example cross sectional diameter dimensions of the valve stem and the plate member (for example, valve stem 210 and plate member 224 illustrated in FIG. 2). In the examples of FIG. 6, it is assumed that the width of the bottom surface of the valve head (e.g., 216) is 20.4 mm (outer valve head diameter), the width of the top surface of the valve head (e.g., 218) is 17.8 mm (inner seat diameter). Force curves 602, 604 and 606 illustrate the valve open force (i.e., force on an open valve that causes the valve to close) for a valve stem diameter of 9 mm., 7 mm. and 5 mm., respectively. As illustrated, the larger the diameter of the valve stem (i.e., increased surface area at top of valve stem (Patm), a larger open force is generated. Taking force curve 602 as an example, a valve stem diameter of 9 mm causes a constant open force of approximately 1600 N. Force curves 608, 610 and 612 illustrate the valve closed force (i.e., force on the valve when the valve is closed) over the range of plate member diameters 11-20 mm, and for a valve stem diameter of 9 mm., 7 mm. and 5 mm., respectively. As can be observed by the force curves 608, 610 and 612, the net force acting on the valve decreases as the diameter of the plate member increases and as the diameter of the valve stem decreases. Thus, in embodiments described herein, the net force acting on the valve may be controlled by controlling the plate member diameter and/or valve stem diameter, and thus the net force acting on the valve may be reduced by increasing the plate diameter and decreasing the valve stem diameter. Of course, those skilled in the art will recognize that there is a structural limit to the valve stem diameter, i.e., the valve stem should have sufficient tensile/sheer and fatigue strength for a given operating environment based on, for example, intake port pressures, cylinder port pressures, speed of operation, etc. In addition, the plate member diameter and/or valve stem diameter sized to ensure that there is sufficient force on the valve to keep the valve seated (when closed) and to close the valve (when open) and to ensure the valve remains coupled to the valve train components. Such considerations may be based on, for example, intake port pressures, cylinder port pressures, speed of operation, etc.

FIGS. 7A, 7B, 7C and 7D illustrate example dynamic effects graphs 700 for selected plate member diameters for any one, or any combination, of the valve systems of FIGS. 2-5. In the examples shown in FIGS. 7A, 7B, 7C and 7D it is assumed that the width of the bottom surface of the valve head (e.g., 216) is 20.4 mm (outer valve head diameter), the width of the top surface of the valve head (e.g., 218) is 17.8 mm (inner seat diameter). Graph 702 illustrates pressure dynamics as a function of engine crank angle (duration of valve opening and closing) for the intake port, cylinder port, and for plate member diameters of 12.00, 14.00, 16.00, 17.80, and 19.50 mm at volume 232, respectively. As illustrated, the port pressure dynamics are not significantly changed for plate member diameters in the stated range. Graph 704 illustrates that valve seat force as a function of engine crank angle. As illustrated, as the plate member diameter increases, the valve seat force decreases. Notably, curve 706 (plate member diameter of 19.50 mm) is near zero net force, meaning there is likely insufficient force to keep the valve seated when closed. This effect is explained, in part, because the plate member diameter (19.50 mm) is larger than the assumed inner seat diameter (17.8 mm). Thus, the limit for the plate member diameter may be equal to or less than the inner seat diameter. Graph 708 illustrates the valve pressure force as a function of engine crank angle for the stated plate member diameters. As illustrated, as the plate member diameter increases, the valve pressure force decreases. Notably, curve 710 (plate member diameter of 19.50 mm) is near zero net force, meaning there is likely insufficient pressure to keep the valve seated when closed. This effect is explained, in part, because the plate member diameter (19.50 mm) is larger than the assumed inner seat diameter (17.8 mm). Thus confirming that the limit for the plate member diameter may be equal to or less than the inner seat diameter. Graph 712 illustrates valve lift (in mm) as a function of engine crank angle. As illustrated, the valve lift is not significantly impacted by plate member diameters in the stated range.

FIGS. 8A, 8B, 8C and 8D illustrate example dynamic effects graphs 800 for selected pipe lengths for any one, or any combination, of the valve systems of FIGS. 2-5. In the examples shown in FIGS. 8A, 8B, 8C and 8D, it is assumed that the width of the bottom surface of the valve head (e.g., 216) is 20.4 mm (outer valve head diameter), the width of the top surface of the valve head (e.g., 218) is 17.8 mm (inner seat diameter), and the nominal (baseline) length of the pipe (e.g., pipe 222) is approximately 40 mm. Graph 802 illustrates pressure dynamics as a function of engine crank angle (duration of valve opening and closing) for the intake port, cylinder port, and for pipe lengths of 20 mm, 40 mm and 80 mm at volume 232, respectively. As illustrated, the port pressure dynamics are not significantly changed for pipe lengths in the stated range. Graph 804 illustrates the valve seat force as a function of engine crank angle. As illustrated, as the pipe length increases, transient events of the valve seat force increase. For example comparing curve 816 (20 mm pipe length) to curve 806 (80 mm pipe length) it is notable that the transient forces may swing near zero, which may allow the valve to become unstable and unseat. This effect is explained, in part, because of time delay in pressure dynamics between the intake port and the open area above the plate member. Thus, the limit for the pipe length may be equal to or less than the plate member diameter. Graph 808 illustrates the valve pressure force as a function of engine crank angle for the stated pipe lengths. As illustrated, as the pipe length increases, the valve pressure force decreases. Notably, curve 818 (pipe length of 80 mm) is near zero net force, meaning there is likely insufficient pressure to keep the valve seated when closed, thus confirming that the limit for the pipe length may be equal to or less than the plate member diameter. Graph 810 illustrates that valve lift (in mm) as a function of engine crank angle. As illustrated, uncontrolled transient movements are observed for a pipe length of 80 mm (curve 814), as compared to curve 812 (20 mm). Thus, the shorter the pipe length, compared to the diameter of the plate member, generally operates to increase dynamic control of the valve, and decrease the chance that the valve will become unseated in operation.

FIGS. 9A, 9B, 9C and 9D illustrate example dynamic effects graphs 900 for selected pipe widths for any one, or any combination, of the valve systems of FIGS. 2-5. In the examples of FIGS. 9A, 9B, 9C and 9D it is assumed that the width of the bottom surface of the valve head (e.g., 216) is 20.4 mm (outer valve head diameter), the width of the top surface of the valve head (e.g., 218) is 17.8 mm (inner seat diameter). Graph 902 illustrates pressure dynamics as a function of engine crank angle (duration of valve opening and closing) for the intake port, cylinder port, and for pipe widths of 2.00, 4.00, 6.00 and 8.00 at volume 232, respectively. As illustrated, the port pressure dynamics are modestly impacted by pipe widths: the smaller the width the more dynamic pressure changes are observed. Graph 904 illustrates the valve seat force as a function of engine crank angle for the stated pipe widths. As illustrated, as the pipe width increases, transient events of the valve seat force decrease. For example comparing curve 906 (8.00 mm pipe width) to curve 908 (2.00 mm pipe width) it is notable that for the smaller pipe width the transient forces may swing near zero, which may allow the valve to become unstable and unseat. This effect is explained, in part, because of direct pressure dynamics between the intake port and the open area above the plate member. Thus, a lower limit for the pipe width may be approximately equal to half of the plate member diameter. Graph 910 illustrates the valve pressure force as a function of engine crank angle for the stated pipe widths. As illustrated, as the pipe width increases, the stability of the valve pressure force increases. Notably, curve 912 (pipe width of 2.00 mm) has significant transient force events, as compared to curve 914 (pipe width of 8.00 mm) thus confirming that stability and control of the valve operation is increased as the pipe width is increased. Graph 916 illustrates that valve lift (in mm) as a function of engine crank angle. As illustrated, uncontrolled transient movements are observed for a pipe width of 2.00 mm (curve 920), as compared to curve 918 (pipe width of 8.00 mm). Thus, the wider the pipe, compared to the diameter of the plate member, generally operates to increase dynamic control of the valve, and decrease the chance that the valve will become unseated in operation.

Accordingly, in one example the present disclosure provides a valve system that includes a housing defining an intake port, a cylinder port and a valve bore; wherein the intake port defining a valve seat portion at an interface between the intake port and the cylinder port. The valve system also includes a valve to control fluid communication between the intake port and the cylinder port. The valve includes a valve stem disposed within the valve bore and extending into the cylinder port and extending out of the housing, the valve stem having an open face exposed to atmospheric pressure; and a valve head coupled to the valve stem comprising a first face and an opposing second face. In an open state the valve is moved so that the valve head moves into the intake port to equalize pressure between the intake port and the cylinder port. In a closed state the second face of the valve head engages the valve seat portion and the first face of the valve head is exposed to an intake port. The first face of the valve head is exposed to a closing force based on an intake port pressure, a cylinder port pressure and the atmospheric pressure. A diameter of the valve stem is selected to control the closing force on the first face of the valve head.

In another example, the present disclosure provides a valve system that includes a housing defining an intake port, a cylinder port, a valve bore, and an extension portion extending from the cylinder port; wherein the intake port defining a valve seat portion at an interface between the intake port and the cylinder port. The valve system also includes a valve to control fluid communication between the intake port and the cylinder port. The valve includes a valve stem disposed within the valve bore and extending into the cylinder port and extending out of the housing, the valve stem having an open face exposed to atmospheric pressure. The valve also includes a valve head coupled to the valve stem comprising a first face and an opposing second face. The valve system also includes a plate member coupled to the valve stem, the plate member disposed within the extension volume, and the plate member having a first face and an opposing second face. The valve system also includes a pipe to provide fluid communication between the intake port and the extension volume; wherein the first face of the plate member is exposed to a cylinder port pressure and the second face of the plate member is exposed to an intake port pressure via the pipe. In an open state the valve is moved so that the valve head moves into the intake port to equalize pressure between the intake port and the cylinder port. In a closed state the second face of the valve head engages the valve seat portion and the first face of the valve head. The valve is exposed to a closing force based on the intake port pressure, the cylinder port pressure and atmospheric pressure.

In another example, the present disclosure provides a valve system that includes a housing defining an intake port, a cylinder port, a valve bore, and an extension volume extending from the cylinder port; wherein the intake port defining a valve seat portion at an interface between the intake port and the cylinder port. The valve system also includes a valve to control fluid communication between the intake port and the cylinder port. The valve includes a valve stem disposed within the valve bore and extending into the cylinder port and extending out of the housing, the valve stem having an open face exposed to atmospheric pressure. The valve also includes a valve head coupled to the valve stem comprising a first face and an opposing second face. The valve system also includes a plate member coupled to the valve stem, the plate member disposed within the extension volume, and the plate member having a first face and an opposing second face. The valve system also includes a pipe to provide fluid communication between the intake port and the extension volume; wherein the first face of the plate member is exposed to a cylinder port pressure and the second face of the plate member is exposed to an intake port pressure. In an open state the valve is moved so that the valve head moves into the intake port to equalize pressure between the intake port and the cylinder port. In a closed state the second face of the valve head engages the valve seat portion and the first face of the valve head is exposed to an intake port. The first face of the valve is exposed to a closing force based on an intake port pressure, a cylinder port pressure and the atmospheric pressure. A diameter of the plate member is selected to control a closing force on the first face of the valve head.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed:

1. A valve system, comprising:
   a housing defining an intake port, a cylinder port and a valve bore; wherein the intake port defining a valve seat portion at an interface between the intake port and the cylinder port; and
   a valve to control fluid communication between the intake port and the cylinder port; the valve comprising:
      a valve stem disposed within the valve bore and extending into the cylinder port and extending out of the housing, the valve stem having an open face exposed to atmospheric pressure; and
      a valve head coupled to the valve stem comprising a first face and an opposing second face; wherein
      in an open state the valve is moved so that the valve head moves into the intake port to equalize pressure between the intake port and the cylinder port; and in a closed state the second face of the valve head engages the valve seat portion and the first face of the valve head is exposed to an intake port; wherein the first face of the valve is exposed to a closing force based on an intake port pressure, a cylinder port pressure and the atmospheric pressure; and wherein a diameter of the valve stem is selected to control the closing force on the first face of the valve head.

2. The valve system of claim 1, wherein in the open state the first face of the valve head is exposed to the intake port pressure, the second face of the valve head is exposed to the intake port pressure, and the open face of the valve stem is exposed to atmospheric pressure such that the closing force urging the valve to close against the valve seat portion is approximately equal to:

(an area of the first face×intake port pressure)−(an area of the second face×intake port pressure)−(an area of the open face of the valve stem× atmospheric pressure).

3. The valve system of claim 1, wherein in the closed state the first face of the valve head is exposed to the intake port pressure, the second face of the valve head is exposed to the cylinder port pressure, and the open face of the valve stem is exposed to atmospheric pressure such that the closing force maintaining the valve against the valve seat portion is approximately equal to:

(an area of the first face×intake port pressure)−(an area of the second face×cylinder port pressure)−(an area of the open face of the valve stem× atmospheric pressure).

4. The valve system of claim 1, wherein the housing further defining an extension volume extending from the cylinder port; and wherein the valve system further comprising:
 a plate member coupled to the valve stem, the plate member disposed within the extension volume, and the plate member having a first face and an opposing second face; and
 a pipe to provide fluid communication between the intake port and the extension volume; wherein the first face of the plate member is exposed to the cylinder port pressure and the second face of the plate member is exposed to the intake port pressure.

5. The valve system of claim 4, wherein in the open state the first face of the valve head is exposed to the intake port pressure, the second face of the valve head is exposed to the intake port pressure, the first face of the plate member is exposed to the intake port pressure, the second face of the plate member is exposed to the intake port pressure, and the open face of the valve stem is exposed to the atmospheric pressure such that the closing force urging the valve to close against the valve seat portion is approximately equal to:

(an area of the first face of the valve head×intake port pressure)−(an area of the second face of the valve head×intake port pressure)+(an area of the first face of the plate member×intake port pressure)−(an area of the second face of the plate member×intake port pressure)−(an area of the open face of the valve stem×atmospheric pressure).

6. The valve system of claim 4, wherein in the closed state the first face of the valve head is exposed to the intake port pressure, the second face of the valve head is exposed to the cylinder port pressure, the first face of the plate member is exposed to the cylinder port pressure, the second face of the plate member is exposed to the intake port pressure, and the open face of the valve stem is exposed to the atmospheric pressure such that the closing force maintaining the valve against the valve seat portion is approximately equal to:

(an area of the first face of the valve head×intake port pressure)−(an area of the second face of the valve head×cylinder port pressure)+(an area of the first face of the plate member×cylinder port pressure)−(an area of the second face of the plate member×intake port pressure)−(an area of the open face of the valve stem×atmospheric pressure).

7. The valve system of claim 4, wherein a diameter of the plate member is selected to control the closing force on the first face of the valve head.

8. A valve system, comprising:
 a housing defining an intake port, a cylinder port, a valve bore, and an extension portion extending from the cylinder port; wherein the intake port defining a valve seat portion at an interface between the intake port and the cylinder port; and
 a valve to control fluid communication between the intake port and the cylinder port; the valve comprising:
  a valve stem disposed within the valve bore and extending into the cylinder port and extending out of the housing, the valve stem having an open face exposed to atmospheric pressure; and
  a valve head coupled to the valve stem comprising a first face and an opposing second face;
 a plate member coupled to the valve stem, the plate member disposed within the extension volume, and the plate member having a first face and an opposing second face; and
 a pipe to provide fluid communication between the intake port and the extension volume; wherein the first face of the plate member is exposed to a cylinder port pressure and the second face of the plate member is exposed to an intake port pressure via the pipe;
 wherein in an open state the valve is moved so that the valve head moves into the intake port to equalize pressure between the intake port and the cylinder port; and in a closed state the second face of the valve head engages the valve seat portion and the first face of the valve head; wherein the valve is exposed to a closing force based on the intake port pressure, the cylinder port pressure and atmospheric pressure.

9. The valve system of claim 8, wherein in the open state the first face of the valve head is exposed to the intake port pressure, the second face of the valve head is exposed to the intake port pressure, the first face of the plate member is exposed to the intake port pressure, the second face of the plate member is exposed to the intake port pressure, and the open face of the valve stem is exposed to atmospheric pressure such that the closing force urging the valve to close against the valve seat portion is approximately equal to:

(an area of the first face of the valve head×intake port pressure)−(an area of the second face of the valve head×intake port pressure)+(an area of the first face of the plate member×intake port pressure)−(an area of the second face of the plate member×intake port pressure)−(an area of the open face of the valve stem×atmospheric pressure).

10. The valve system of claim 8, wherein in the closed state the first face of the valve head is exposed to the intake port pressure, the second face of the valve head is exposed to the cylinder port pressure, the first face of the plate member is exposed to the cylinder port pressure, the second face of the plate member is exposed to the intake port pressure, and the open face of the valve stem is exposed to atmospheric pressure such that the closing force maintaining the valve against the valve seat portion is approximately equal to:

(an area of the first face of the valve head×intake port pressure)−(an area of the second face of the valve head×cylinder port pressure)+(an area of the first face of the plate member×cylinder port pressure)−(an area of the second face of the plate member×intake port pressure)−(an area of the open face of the valve stem×atmospheric pressure).

11. The valve system of claim 8, wherein a diameter of the plate member is selected to control a closing force on the first face of the valve head.

12. The valve system of claim 8, wherein a diameter of the valve stem is selected to control a closing force on the first face of the valve head.

13. The valve system of claim 8, further comprising at least one flow restrictor disposed within the pipe to reduce pressure variations in the extension volume that are associated with pressure variations of the intake port.

14. The valve system of claim 8, wherein a length of the pipe is selected to control a closing force on the first face of the valve head.

15. The valve system of claim 8, wherein a width of the pipe is selected to control a closing force on the first face of the valve head.

16. A valve system, comprising:
a housing defining an intake port, a cylinder port, a valve bore, and an extension volume extending from the cylinder port; wherein the intake port defining a valve seat portion at an interface between the intake port and the cylinder port; and
a valve to control fluid communication between the intake port and the cylinder port; the valve comprising:
a valve stem disposed within the valve bore and extending into the cylinder port and extending out of the housing, the valve stem having an open face exposed to atmospheric pressure; and
a valve head coupled to the valve stem comprising a first face and an opposing second face;
a plate member coupled to the valve stem, the plate member disposed within the extension volume, and the plate member having a first face and an opposing second face; and
a pipe to provide fluid communication between the intake port and the extension volume; wherein the first face of the plate member is exposed to a cylinder port pressure and the second face of the plate member is exposed to an intake port pressure;
in an open state the valve is moved so that the valve head moves into the intake port to equalize pressure between the intake port and the cylinder port; and in a closed state the second face of the valve head engages the valve seat portion and the first face of the valve head is exposed to an intake port; wherein the first face of the valve is exposed to a closing force based on an intake port pressure, a cylinder port pressure and the atmospheric pressure; and wherein a diameter of the plate member is selected to control a closing force on the first face of the valve head.

17. The valve system of claim 16, wherein in the open state the first face of the valve head is exposed to the intake port pressure, the second face of the valve head is exposed to the intake port pressure, the first face of the plate member is exposed to the intake port pressure, the second face of the plate member is exposed to the intake port pressure, and the open face of the valve stem is exposed to atmospheric pressure such that the closing force urging the valve to close against the valve seat portion is approximately equal to:

(an area of the first face of the valve head×intake port pressure)−(an area of the second face of the valve head×intake port pressure)+(an area of the first face of the plate member×intake port pressure)−(an area of the second face of the plate member×intake port pressure)−(an area of the open face of the valve stem×atmospheric pressure).

18. The valve system of claim 16, wherein in the closed state the first face of the valve head is exposed to the intake port pressure, the second face of the valve head is exposed to the cylinder port pressure, the first face of the plate member is exposed to the cylinder port pressure, the second face of the plate member is exposed to the intake port pressure, and the open face of the valve stem is exposed to atmospheric pressure such that the closing force maintaining the valve against the valve seat portion is approximately equal to:

(an area of the first face of the valve head×intake port pressure)−(an area of the second face of the valve head×cylinder port pressure)+(an area of the first face of the plate member×cylinder port pressure)−(an area of the second face of the plate member×intake port pressure)−(an area of the open face of the valve stem×atmospheric pressure).

19. The valve system of claim 16, wherein a diameter of the valve stem is selected to control the closing force on the first face of the valve head.

20. The valve system of claim 16, further comprising at least one flow restrictor disposed within the pipe to reduce pressure variations in the extension volume that are associated with pressure variations of the intake port.

21. The valve system of claim 16, wherein a length of the pipe is selected to control a closing force on the first face of the valve head.

22. The valve system of claim 16, wherein a width of the pipe is selected to control a closing force on the first face of the valve head.

* * * * *